United States Patent
Ikeda et al.

(10) Patent No.: US 6,236,560 B1
(45) Date of Patent: May 22, 2001

(54) ELECTRODE FOR AN ELECTRIC DOUBLE LAYER CAPACITOR AND ELECTRIC DOUBLE LAYER CAPACITOR EMPLOYING THE ELECTRODE

(75) Inventors: Katsuji Ikeda; Manabu Suhara; Takeshi Kawasato, all of Yokohama (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 09/296,468

(22) Filed: Apr. 22, 1999

(30) Foreign Application Priority Data

Apr. 23, 1998 (JP) .................................................. 10-113832

(51) Int. Cl.⁷ .............................. H01G 9/00; H01G 9/155
(52) U.S. Cl. ........................... 361/502; 361/503; 29/25.03
(58) Field of Search ..................................... 361/502, 503, 361/504; 29/25.03; 423/445 R

(56) References Cited

U.S. PATENT DOCUMENTS

| 4,862,328 | 8/1989 | Morimoto et al. . |
| 5,682,288 | * 10/1997 | Wani ..................................... 361/502 |

OTHER PUBLICATIONS

JIS K 6891:1995, Testing Methods for Polytetrafluoroethylene Molding Powder (w/English Translation).
Product information for Teflon PTFE 7 A p. 1–3, Jun. 1999.*
Product information for Teflon PTFE NXT 70 p. 1–4, Jun. 1999.*
Product information for Teflon PTFE NXT 75 p. 1–4, Jun. 1999.*
Product information for Fluon CD141, none.*
Asahi Glass website; www.fluoropolymers.com, none.*

* cited by examiner

Primary Examiner—Dean A. Reichard
Assistant Examiner—Eric Thomas
(74) Attorney, Agent, or Firm—Oblon, Spivak, McClelland, Maier & Neustadt, P.C.

(57) ABSTRACT

An electrode for an electric double layer capacitor including a carbonaceous material and a binder, wherein the binder includes a polytetrafluoroethylene which is made from a fine powder of polytetrafluoroethylene having a specific gravity of at most 2.18 as defined in JIS-K6891.

10 Claims, No Drawings

ELECTRODE FOR AN ELECTRIC DOUBLE LAYER CAPACITOR AND ELECTRIC DOUBLE LAYER CAPACITOR EMPLOYING THE ELECTRODE

The present invention relates to an electrode for an electric double layer capacitor, particularly an electrode for an electric double layer capacitor having excellent mechanical strength and a large capacitance.

The electric double layer capacitor is based on a principle to store electric charge in an electric double layer formed at the interface between an electrode and an electrolyte. In order to obtain an improved capacitance density of the electric double layer capacitor, it is common to employ as a material for the electrode, a material having a high specific surface area, including a carbonaceous material such as activated carbon and carbon black, and fine particles of a metal and conductive metal oxide. For efficient charging and discharging, the electrode is bonded to a current collector made of a layer or a foil having low resistance, such as a metal or graphite. As the current collector, it is common to employ a valve metal such as aluminum or a stainless steel such as SUS304 or SUS316L, which are electrochemically highly corrosion resistant.

As an electrolyte for the electric double layer capacitor, an organic electrolyte and an aqueous electrolyte are available. However, an attention has been drawn to an electric double layer capacitor employing an organic electrolyte, as the operating voltage is high, and the energy density in the charged state can be made high. In the case of using an organic electrolyte, if water is present in the interior of an electric double layer capacitor cell, the water may be electrolyzed and deteriorate the performance. Accordingly, the electrode is required to have water completely removed, and usually the electrode is subjected to drying treatment by heating under reduced pressure.

In the case of using an organic electrolyte, activated carbon is mainly used as the main component for the electrode. However, activated carbon is usually in a powder form. Accordingly, activated carbon is mixed with a binder such as polytetrafluoroethylene, molded into an electrode sheet, which is then electrically connected with a current collector by means of an electroconductive adhesive layer, to form an electrode assembly.

Since polytetrafluoroethylene is excellent in heat resistance and chemical stability, it has been known to use an electrode which is made by using polytetrafluoroethylene as a binder, mixing activated carbon therewith followed by kneading and stretching, thereby forming polytetrafluoroethylene into fibers to form a continuous fine porous structure (JP-B-7-105316). However, in such a case, if polytetrafluoroethylene is not adequately formed into fibers, it can not support activated carbon adequately, thus lowering mechanical strength of the electrode. In order to supplement mechanical strength, the amount of polytetrafluoroethylene may be increased. However, in such a case, the amount of activated carbon will be relatively small. Accordingly, the capacitance of an electric double layer capacitor per unit volume (hereinafter referred to as capacitance density) decreases.

The present invention has been made to overcome above-mentioned problems, and it is an object of the present invention to provide an electrode suitable for an electric double layer capacitor having excellent mechanical properties and high capacitance, and an electric double layer capacitor employing the electrode.

The present invention provides an electrode for an electric double layer capacitor comprising a carbonaceous material and a binder, wherein the binder comprises a polytetrafluoroethylene which is made from a fine powder of polytetrafluoroethylene having a specific gravity of at most 2.18 as defined in JIS-K6891, and an electric double layer capacitor employing the electrode.

The present invention further provides an electrode for an electric double layer capacitor comprising a carbonaceous material and a binder, wherein the binder comprises a polytetrafluoroethylene which is made from a fine powder of polytetrafluoroethylene made of aggregate of particles having an average primary particle size of from 0.26 to 0.40 µm, and an electric double layer capacitor employing the electrode.

The present inventors have conducted extensive studies particularly on polytetrafluoroethylene as a binder to overcome above-mentioned problems, and as a result, they have found that it is effective to use a fine powder of polytetrafluoroethylene having a high molecular weight, or a fine powder of polytetrafluoroethylene made of aggregate of particles having a specific primary particle size.

The electrode of the present invention is preferably a porous sheet wherein the polytetrafluoroethylene is formed into fibers to form a continuous fine porous structure, and a carbonaceous material is supported by said structure. The fine powder of polytetrafluoroethylene is three-dimensionally formed into fibers by extraneous stress such as sheer, rolling or stretching, to form a continuous fine porous structure. As the carbonaceous material can be contained densely in the continuous fine porous structure, with an electrode made of the structure, high capacitance can be obtained. Further, as fine fibers are present, suitable flexibility and high mechanical strength can be obtained.

The above electrode is produced preferably in such a manner, for example, that a mixture comprising a carbonaceous material, a fine powder of polytetrafluoroethylene and a liquid lubricant is kneaded and molded into a sheet, and the molded product is subjected to rolling treatment and/or stretching treatment. In such a case, the rolling treatment may be conducted either monoaxially or multiaxially, and the liquid lubricant is removed before or after the rolling treatment and/or the stretching treatment. It is particularly preferred to conduct extrusion molding of the mixture by e.g. paste extrusion or screw extrusion, followed by the rolling treatment and/or the stretching treatment, as the fine powder of polytetrafluoroethylene is formed into fibers in both length and breadth direction to constitute a three-dimensional network structure, and a thin electrode sheet can be continuously produced.

The fine powder of polytetrafluoroethylene of the present invention is a powder obtained through an aggregation step from a dispersion, which is obtainable by a dispersion polymerization conducted in an aqueous medium, which is one of common polymerization methods of polytetrafluoroethylene. The primary particle size of polytetrafluoroethylene obtained by the polymerization method, i.e. the dispersed particle size in water during the polymerization, is usually from 0.15 to 0.40 µm.

Particularly, the particle size of a fine powder to be aggregate after the polymerization is from 0.20 to 0.25 µm.

In the present invention, a fine powder of polytetrafluoroethylene made of aggregate of particles having an average primary particle size of from 0.26 to 0.40 µm, is used as a binder for the electrode. By using a fine powder of polytetrafluoroethylene having a particle size of such a range, an electrode having excellent mechanical strength and high capacitance, can be obtained. Further, above-mentioned porous structure can be effectively produced.

Usually, primary particles of a fine powder of polytetrafluoroethylene are not spherical, but in a form of straw bags having the aspect ratio not being 1. Accordingly, the primary particle size in the present invention is represented by average of the minor axis and the major axis of the primary particles observed by an electron micrograph. As a specific measuring method, the primary particle size of from 100 to 10,000 particles of the fine powder of polytetrafluoroethylene is measured at random by observation by penetration electron microscope, and the average is taken as an average primary particle size.

If the average primary particle size of the fine powder of polytetrafluoroethylene is less than 0.26 μm, the polytetrafluoroethylene is not adequately formed into fibers by shear, rolling or stretching, thus lowering mechanical strength of the obtained electrode sheet. If the primary particle size exceeds 0.40 μm, dispersion stability of the fine powder of polytetrafluoroethylene in water tends to be low. Accordingly, a powder having an average primary particle size of exceeding 0.40 μm can not be obtained by the above polymerization method. The average primary particle size is particularly preferably from 0.28 to 0.35 μm.

Further, in the present invention, as a binder for the electrode, a fine powder of polytetrafluoroethylene having a specific gravity of at most 2.18 as measured by the method defined in JIS-K6891 (the specific gravity measured by the method is referred to as SSG hereinafter), is used. Polytetrafluoroethylene is insoluble and infusible, and thus it is difficult to directly measure the molecular weight. Accordingly, for one having a relatively high molecular weight, utilizing slow crystallizing rate, the specific gravity can be a standard indicating the molecular weight of the polymer. The higher the molecular weight, the smaller the SSG value.

By adjusting SSG of the fine powder of polytetrafluoroethylene to be at most 2.18, an electrode having excellent mechanical strength and a large capacitance can be obtained. This is considered to be attributable to the fact that a fine powder of polytetrafluoroethylene having a high molecular weight is easily formed into fibers by shear, rolling or stretching, and the above porous structure can be effectively produced. SSG is particularly preferably at most 2.16.

Further, SSG is preferably at least 2.10. If it is less than 2.10, crystallization of the fine powder of polytetrafluoroethylene tends to be inadequate. Accordingly, the fine powder of polytetrafluoroethylene may not be adequately formed into fibers for preparing the electrode, thus lowering strength of the electrode. SSG is more preferably at least 2.14.

In the present invention, when the fine powder of polytetrafluoroethylene satisfies either property that it has SSG of at most 2.18 or property that it is made of aggregate of particles having an average primary particle size of from 0.26 to 0.40 μm, an electrode suitable for an electric double layer capacitor having excellent mechanical properties and a large capacitance, can be obtained. However, to obtain more excellent mechanical strength and a larger capacitance, it is preferred that the fine powder of polytetrafluoroethylene has SSG of at most 2.18, and is made of aggregate of particles having an average primary particle size of from 0.26 to 0.40 μm.

Polytetrafluoroethylene in the present invention may be not only a homopolymer of tetrafluoroethylene, but also a so-called trace copolymer having a comonomer copolymerized to such an extent that melt molding can not be conducted. As the comonomer copolymerized for such a trace copolymer, a fluorine-containing ethylene monomer may be used. Specifically, hexafluoropropylene, chlorotrifluoroethylene, perfluoro(alkyl vinyl ether) or (perfluoroalkyl) ethylene may, for example, be mentioned. In such a case, the polymer units based on the comonomer are contained in an amount of at most 1.0 wt % in polytetrafluoroethylene.

In the electrode of the present invention, polytetrafluoroethylene is contained in an amount of preferably from 1 to 50 wt %, particularly preferably from 3 to 30 wt %, to the carbonaceous material. If the content of polytetrafluoroethylene is large, although mechanical strength improves, the amount of the carbonaceous material in the electrode relatively decreased, thus decreasing the capacitance of the electrode. Further, if the content of polytetrafluoroethylene is less than 1 wt %, mechanical strength of the electrode is low. In the present invention, by using a fine powder of polytetrafluoroethylene having a large primary particle size, strength can be made high. Accordingly, with an extremely small amount of the fine powder of polytetrafluoroethylene, particularly in an amount of at most 10 wt %, adequate mechanical properties can be obtained, and a large capacitance can be obtained as an electric double layer capacitor.

The carbonaceous material contained in the continuous fine porous structure constituting the electrode in the present invention, is preferably one having a specific surface area of from 700 to 3,000 m$^2$/g, particularly from 1,000 to 2,500 m$^2$/g, as a large capacitance can be obtained. Specifically, activated carbon, carbon black or polyacene may, for example, be mentioned. Particularly, a carbonaceous material having, as the main component, activated carbon having a specific surface area of from 700 to 3,000 m$^2$/g, and as an electroconductive material, carbon black such as acetylene black or ketchen black added in an amount of from 5 to 20 wt % in the electrode, is preferred, since an electrode sheet having a large capacitance and high electroconductivity can be obtained. As activated carbon, any one of phenol type, rayon type, acryl type, pitch type or coconut shell type may be used.

In the present invention, it is preferred to use a carbonaceous material in a powder form, since a larger capacitance can be obtained as compared with one in a fiber form having the same specific surface area. The carbonaceous power has a particle size of preferably from 0.1 to 200 μm, particularly preferably from 1 to 50 μm, since high strength can be obtained when it is molded into an electrode sheet. However, as the case requires, ground carbon fiber having a length of from 0.1 to 200 μm, particularly from 1 to 50 μm, may, for example, be used.

The organic electrolyte to be used for an electric double layer capacitor of the present invention, is not particularly limited, and an organic electrolyte containing a salt dissociable into ions in a known organic solvent may be used. It is particularly preferred to use an organic electrolyte having dissolved in an organic solvent a salt comprising a quaternary onium cation represented by $R^1R^2R^3R^4N^+$ or $R^1R^2R^3R^4P^+$, wherein each of $R^1$, $R^2$, $R^3$ and $R^4$ which may be the same or different, is an alkyl group, and an anion such as $BF_4^-$, $PF_6^-$, $ClO_4^-$ or $CF_3SO_3^-$.

The above organic solvent is preferably at least one solvent selected from the group consisting of carbonates such as propylene carbonate, butylene carbonate, dimethyl carbonate, diethyl carbonate and ethylmethyl carbonate, lactones such as γ-butyrolactone, sulfolane and acetonitrile.

As the separator for the electric double layer capacitor of the present invention, a cellulose paper, a cellulose/glass fiber mixed paper, a glass fiber mat, a porous polypropylene sheet or a porous polytetrafluoroethylene sheet may, for example, be used. Among these, a glass fiber mat having high heat resistance and low water content, and a cellulose paper having high strength even though it is thin, are preferred.

The electric double layer capacitor of the present invention can be obtained preferably in such a manner that a pair of stripe electrode assembly, as a positive electrode assembly and a negative electrode assembly, with a stripe separator interposed therebetween, is wound to form an element, which is then accommodated in a bottomed cylindrical container, impregnated with an organic electrolyte, and sealed with an upper lid made of a thermosetting insulant resin and equipped with a positive terminal and a negative terminal. In this case, it is preferred that the material of the container is aluminum, and rubber ring is arranged at the periphery of the upper lid for curling sealing.

It is also possible to constitute a rectangular electric double layer capacitor in such a manner that a plurality of rectangular electrode assemblies, as the same number of positive electrode assemblies and negative electrode assemblies, are alternately laminated with a separator interposed therebetween to form an element, which is then accommodated in a bottomed rectangular aluminum container after the lead terminals are removed from the positive electrode assemblies and the negative assemblies, the element is impregnated with an organic electrolyte, sealed by laser welding by using an upper lid equipped with a positive terminal and a negative terminal. By employing such a structure of cylindrical or rectangular, an electric double layer capacitor having a high capacitance and a large capacitance per unit volume, can be obtained.

Now, the present invention will be described in further detail with reference to Examples (Examples 1 to 6) and Comparative Examples (Examples 7 and 8). However, it should be understood that the present invention is by no means restricted to such specific Examples.

EXAMPLE 1

634 g of deionized water, 0.260 g of perfluoroammonium octoate (n—$C_7F_{15}COONH_4$) and 7.9 g of paraffin wax were charged into an autoclave of 1,000 ml equipped with a stirrer, and the system was substituted by tetrafluoroethylene. The temperature in the autoclave was adjusted to be 65° C., and the pressure was elevated to 16 kg/cm$^2$G by tetrafluoroethylene, and 10 ml of 0.5% aqueous succinate peroxide ($HOCOCH_2CH_2CO$—O—O—$COCH_2CH_2COOH$) solution was injected thereto to initiate polymerization.

The polymerization was continued by introducing tetrafluoroethylene to supplement the drop of the internal pressure with the progress of the polymerization. At each time of adding 70 g of tetrafluoroethylene and adding 140 g of tetrafluoroethylene, a solution having 0.20 g of perfluoroammonium octoate dissolved in 15 ml of water was injected into the autoclave, and the polymerization was continued. When 250 of tetrafluoroethylene was added thereto, tetrafluoroethylene was purged, the autoclave was cooled to terminate the polymerization. An aqueous dispersion of obtained polytetrafluoroethylene had a solid content of 26.0 wt %.

The above dispersion was subjected to dyeing observation by a penetration microscope and photographed, and 100 particles were extracted at random from the photograph. The average of the minor axis and the major axis of each particle was taken as its particle size, and the average primary particle size was obtained by an image processing by a computers, which was found to be 0.31 μm.

The dispersion was diluted to about 10 wt %, and agglomerated by mechanical stirring. Water was removed by filtration, followed by drying at a temperature of 180° C. for 7 hours, and a fine powder of polytetrafluoroethylene was obtained. The fine powder of polytetrafluoroethylene had SSG of 2.154.

80 parts by weight of a high purity activated carbon powder having a specific surface area of 1,800 m$^2$/g and an average particle sizes of 10 μm, 10 parts by weight of ketchen black and 10 parts by weight of the above fine powder of polytetrafluoroethylene were mixed, and then kneaded while ethanol was dropwise added thereto, which was then rolled by rolling rolls, dried at a temperature of 200° C. for 30 minutes to remove ethanol, and an electrode sheet having a thickness of 120 μm was prepared. The tensile strength of the electrode sheet was measured, and found to be 0.32 kg/cm$^2$.

The above electrode sheet was bonded to an aluminum foil having a thickness of 50 μm by means of an electroconductive adhesive, followed by heat curing of the adhesive, to obtain an electrode assembly. 44 sheets of electrode assemblies having an effective electrode area of 6.5 cm×12 cm were prepared, 22 sheets of the electrode assemblies as positive electrode assemblies and 22 sheets of the electrode assemblies as negative electrode assemblies were alternately laminated with a glass fiber mat separator having a thickness of 160 μm interposed therebetween, to form an element.

The element was accommodated in a bottomed rectangular aluminum container having a height of 13 cm, a width of 7 cm and a thickness of 2.2 cm, sealed by a laser welding by using an aluminum upper lid equipped with a positive terminal and a negative terminal, and subjected to a vacuum drying at a temperature of 200° C. for 5 hours in a state where the inlet was left open, to remove impurities. Then, a propylene carbonate solution having 1.5 mol/l of $(C_2H_5)_3$ $(CH_3)NPF_6$ as an electrolyte was impregnated to the element under vacuum, and the safety valve was arranged to the inlet, to prepare a rectangular electric double layer capacitor having a width of 7 cm, a height of 15 cm and a thickness of 2.2 cm.

The initial discharge capacitance and internal resistance of the obtained electric double layer capacitor were measured, and the leakage current after charged with the voltage of 2.5 V for 100 hours was measured. Further, the capacitor was charged with a voltage of 2.5 V for 100 hours and then left in an open circuit at a temperature of 25° C. and left for 30 days, whereby the holding voltage of the capacitor was measured.

Then, charging and discharging at a constant current of 50 A with a voltage of from 0 to 2.5 V were repeated for 300,000 cycles in a constant temperature chamber of 45° C. The discharge capacitance and the internal resistance after the 300,000 cycles were measured and compared with the initial properties to calculate capacitance retaining ratio and increasing rate of internal resistance, and the long-term operation reliability of the electric double layer capacitor was evaluated in an accelerated manner. The results are shown in Table 1.

EXAMPLE 2

The same operations as in Example 1 were conducted except that the polymerization was continued until 280 g of tetrafluoroethylene was added to the autoclave, and an aqueous dispersion of polytetrafluoroethylene having a solid content of 26.0 wt % was obtained. The particle size of polytetrafluoroethylene was measured in the same manner as in Example 1, and the average primary particle size was found to be 0.40 μm.

An electrode sheet was prepared in the same manner as in Example 1, except that a fine powder of polytetrafluoroethylene (having SSG of 2.152) was obtained from the above dispersion in the same manner as in Example 1, and used as a binder. The tensile strength of the electrode sheet was 0.35 kg/cm². An electric double layer capacitor was prepared by using the electrode sheet, and evaluated, in the same manner as in Example 1. The results are shown in Table 1.

EXAMPLE 3

An electrode sheet was prepared in the same manner as in Example 2 except that 83 parts by weight of a high purity activated carbon powder, 10 parts by weight of ketchen black and 7 parts by weight of a fine powder of polytetrafluoroethylene were used. The tensile strength of the electrode sheet was 0.35 kg/cm². An electric double layer capacitor was prepared by using the electrode sheet, and evaluated, in the same manner as in Example 1. The results are shown in Table 1.

EXAMPLE 4

The same operations as in Example 1 were conducted except that the amount of perfluoroammonium octoate charged into the autoclave firstly was changed to 0.354 g, and when 70 g of tetrafluoroethylene was added to the system, a solution having 0.791 g of perfluoroammonium octoate dissolved in 15 ml of water was injected thereto, to obtain an aqueous dispersion of polytetrafluoroethylene. The obtained aqueous dispersion had a solid content of 26.0 wt %. The particle size was measured in the same manner as in Example 1, and the average primary particle size was found to be 0.25 μm An electrode sheet was prepared in the same manner as in Example 1, except that a fine powder of polytetrafluoroethylene (having SSG of 2.152) was obtained from the above dispersion in the same manner as in Example 1, and used as a binder. The tensile strength of the electrode sheet was 0.26 kg/cm². An electric double layer capacitor was prepared by using the electrode sheet, and evaluated, in the same manner as in Example 1. The results are shown in Table 1.

EXAMPLE 5

The same operations as in Example 1 were conducted except that as the fine powder of polytetrafluoroethylene as a binder, Fluon CD141 (having an average primary particle size of 0.24 μm) manufactured by Asahi Glass Company Ltd. was used, to prepare an electrode sheet. SSG of the polytetrafluoroethylene was 2.160, and the tensile strength of the electrode sheet was 0.31 kg/cm². An electric double layer capacitor was prepared by using the electrode sheet, and evaluated, in the same manner as in Example 1. The results are shown in Table 1.

EXAMPLE 6

The same operations as in Example 1 were conducted except that when 70 g of tetrafluoroethylene was added to the autoclave, 0.5 g of methanol was added thereto with an aqueous perfluoroammonium octoate solution, to obtain an aqueous dispersion of polytetrafluoroethylene. The particle size of polytetrafluoroethylene was measured in the same manner as in Example 1, and the average primary particle size was found to be 0.29 μm.

An electrode sheet was prepared in the same manner as in Example 1, except that a fine powder of polytetrafluoroethylene (having SSG of 2.229) was obtained from the above dispersion in the same manner as in Example 1, and used as a binder, to prepare an electrode sheet. The tensile strength of the electrode sheet was 0.22 kg/cm². An electric double layer capacitor was prepared by using the electrode sheet, and evaluated, in the same manner as in Example 1. The results are shown in Table 1.

EXAMPLE 7

The same operations as in Example 1 were conducted except that as the fine powder of polytetrafluoroethylene as a binder, Fluon CD1 (having an average primary particle size of 0.24 μm) manufactured by Asahi Glass Company Ltd. was used, to prepare an electrode sheet. SSG of the polytetrafluoroethylene was 2.221, and the tensile strength of the electrode sheet was 0.18 kg/cm². An electric double layer capacitor was prepared by using the electrode sheet, and evaluated, in the same manner as in Example 1. The results are shown in Table 1.

EXAMPLE 8

An electrode was prepared in the same manner as in Example 7 except that 20 parts by weight of the fine powder of polytetrafluoroethylene was used. The tensile strength of the electrode sheet was measured, and found to be 0.25 kg/cm². An electric double layer capacitor was prepared by using the electrode sheet, and evaluated, in the same manner as in Example 1. The results are shown in Table 1.

In Table 1, each unit of discharge capacitance, resistance, leakage current and holding voltage is F, Ω, mA and V, respectively. The amount of PTFE indicates the content (wt %) of polytetrafluoroethylene contained in the electrode sheet, and the term "after charging and discharging" indicates after the 300,000 cycles of charging and discharging.

TABLE 1

| | | | | Initial | | | | | After charging and discharging | |
| | | | | | | | | | Capacitance retaining ratio | Increasing rate of resistance |
| | Particle size | SSG | Amount of PTFE | Electrode strength | Discharge capacitance | Resistance | Leakage current | 30 days after Holding voltage | | |
|---|---|---|---|---|---|---|---|---|---|---|
| Ex. 1 | 0.31 | 2.154 | 10% | 0.32 | 1300 | 2.2 | 0.2 | 2.28 | 90% | 15% |
| Ex. 2 | 0.35 | 2.152 | 10% | 0.40 | 1320 | 2.1 | 0.2 | 2.30 | 91% | 13% |
| Ex. 3 | 0.35 | 2.152 | 7% | 0.35 | 1360 | 2.0 | 0.2 | 2.30 | 90% | 12% |
| Ex. 4 | 0.25 | 2.152 | 10% | 0.26 | 1280 | 2.5 | 0.3 | 2.15 | 80% | 22% |
| Ex. 5 | 0.24 | 2.160 | 10% | 0.31 | 1260 | 2.9 | 0.4 | 2.04 | 75% | 23% |

TABLE 1-continued

|  | Particle size | SSG | Amount of PTFE | Initial | | | | | After charging and discharging | |
|---|---|---|---|---|---|---|---|---|---|---|
|  |  |  |  | Electrode strength | Discharge capacitance | Resistance | Leakage current | 30 days after Holding voltage | Capacitance retaining ratio | Increasing rate of resistance |
| Ex. 6 | 0.29 | 2.229 | 10% | 0.22 | 1270 | 3.0 | 0.4 | 1.95 | 72% | 25% |
| Ex. 7 | 0.24 | 2.221 | 10% | 0.18 | 1270 | 3.3 | 0.6 | 1.80 | 65% | 30% |
| Ex. 8 | 0.24 | 2.221 | 20% | 0.25 | 1200 | 4.1 | 0.4 | 1.93 | 70% | 28% |

The electric double layer capacitor of the present invention has a stable operation performance and little increase in internal resistance of the electrode itself, even after charging and discharging cycles are repeated at a large current density, or even after voltage is applied thereto for a long period of time.

Further, an electrode sheet having high strength can be obtained even with a small amount of a binder. Accordingly, capacitance per unit volume can be made large, and the resistance of the electrode sheet can be made small.

What is claimed is:

1. An electrode for an electric double layer capacitor comprising a carbonaceous material and a binder, wherein the binder comprises a polytetrafluoroethylene which is made from a fine powder of polytetrafluoroethylene having a specific gravity of at most 2.18.

2. The electrode for an electric double layer capacitor according to claim 1, wherein the carbonaceous material comprises activated carbon and carbon black, having a specific surface area of from 700 to 3,000 m$^2$/g, and the carbon black is contained in an amount of from 5 to 20 wt % in the electrode.

3. The electrode for an electric double layer capacitor according to claim 1, wherein the polytetrafluoroethylene is contained in an amount of from 1 to 50 wt % to the carbonaceous material.

4. The electrode for an electric double layer capacitor according to claim 1, wherein the carbonaceous material is a powder having a particle size of from 0.1 to 200 μm.

5. The electrode for an electric double layer capacitor according to claim 1, which is a porous sheet wherein the polytetrafluoroethylene is formed into fibers to form a continuous fine porous structure, and the carbonaceous material is supported by said structure.

6. An electrode for an electric double layer capacitor comprising a carbonaceous material and a binder, wherein the binder comprises a polytetrafluoroethylene which is made from a fine powder of polytetrafluoroethylene, having a specific gravity of at most 2.18 and made of aggregate of particles having an average primary particle size of from 0.26 to 0.40 μm.

7. An electric double layer capacitor, comprising a positive electrode and a negative electrode, each of which comprises a carbonaceous material and a binder, and an organic electrolyte, wherein the binder comprises a polytetrafluoroethylene which is made from a fine powder of polytetrafluoroethylene having a specific gravity of at most 2.18.

8. The electric double layer capacitor according to claim 7, wherein the organic electrolyte has dissolved in an organic solvent a salt comprising a quaternary onium cation represented by $R^1R^2R^3R^4N^+$ or $R^1R^2R^3R^4P^+$, wherein each of $R^1$, $R^2$, $R^3$ and $R^4$ which may be the same or different, is an alkyl group, and an anion selected from the group consisting of $BF_4^-$, $PF_6^-$, $ClO_4^-$ and $CF_3SO_3^-$.

9. The electric double layer capacitor according to claim 7, wherein the organic solvent is at least one solvent selected from the group consisting of propylene carbonate, butylene carbonate, diethyl carbonate, dimethyl carbonate, ethyl methyl carbonate, γ-butyrolactone, sulfolane and acetonitrile.

10. An electric double layer capacitor, comprising a positive electrode and a negative electrode, each of which comprises a carbonaceous material and a binder, and an organic solvent, wherein the binder comprises a polytetrafluoroethylene which is made from a fine powder of polytetrafluoroethylene, having a specific gravity of at most 2.18 and made of aggregate of particles having an average primary particle size of from 0.26 to 0.40 μm.

* * * * *